(12) United States Patent
Itoh

(10) Patent No.: US 12,275,317 B2
(45) Date of Patent: Apr. 15, 2025

(54) POWER CONTROL DEVICE

(71) Applicant: TOYOTA JIDOSHA KABUSHIKI KAISHA, Toyota (JP)

(72) Inventor: Takuya Itoh, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/452,926

(22) Filed: Aug. 21, 2023

(65) Prior Publication Data

US 2024/0198823 A1 Jun. 20, 2024

(30) Foreign Application Priority Data

Dec. 15, 2022 (JP) ................. 2022-200217

(51) Int. Cl.
*B60L 53/22* (2019.01)
*F02D 41/02* (2006.01)
*H02J 7/00* (2006.01)
*H02M 1/00* (2007.01)

(52) U.S. Cl.
CPC ............ *B60L 53/22* (2019.02); *F02D 41/021* (2013.01); *H02J 7/0063* (2013.01); *B60L 2210/10* (2013.01); *H02J 2207/20* (2020.01); *H02M 1/0009* (2021.05)

(58) Field of Classification Search
CPC .... B60L 53/22; B60L 2210/10; F02D 41/021; H02J 7/0063; H02J 2207/20; H02M 1/0009; B60W 20/00; B60W 20/14; B60W 20/15; B60W 20/20; B60W 20/40; B60K 6/00; B60K 6/26; B60K 6/28; B60K 6/42
See application file for complete search history.

(56) References Cited

U.S. PATENT DOCUMENTS

| 6,209,672 B1* | 4/2001 | Severinsky | B60K 6/442 |
| | | | 180/65.23 |
| 2003/0141123 A1* | 7/2003 | Sugiura | B60W 10/26 |
| | | | 903/917 |
| 2007/0125582 A1* | 6/2007 | Egami | B60K 6/445 |
| | | | 180/54.1 |

(Continued)

FOREIGN PATENT DOCUMENTS

| JP | 2001263120 A | * 9/2001 | ............ B60K 6/543 |
| JP | 2020-157861 A | 10/2020 | |

*Primary Examiner* — Daniel Cavallari
*Assistant Examiner* — Thai H Tran
(74) *Attorney, Agent, or Firm* — SoraIP, Inc.

(57) ABSTRACT

A power control device for controlling a power supply system, the power control device including a DCDC converter for supplying power of a battery to a load, and an alternator connected in parallel with a DCDC converter for supplying generated power to the load, the power control device including: a monitoring unit for monitoring a current output from DCDC converter to the load; and a control unit for controlling an operation of DCDC converter and the alternator, wherein the control unit controls the alternator to generate electric power when an output current of DCDC converter monitored by the monitoring unit is equal to or greater than a first threshold value, and controls the alternator not to generate electric power when an output current of DCDC converter monitored by the monitoring unit is equal to or less than a second threshold value, which is smaller than the first threshold value.

3 Claims, 2 Drawing Sheets

(56) References Cited

U.S. PATENT DOCUMENTS

| | | | |
|---|---|---|---|
| 2013/0066497 A1* | 3/2013 | Nissato | B60K 6/448 |
| | | | 180/65.245 |
| 2016/0280208 A1* | 9/2016 | Yamauchi | B60W 10/06 |
| 2020/0309079 A1 | 10/2020 | Watanabe et al. | |
| 2021/0031748 A1* | 2/2021 | Watanabe | B60W 10/30 |

* cited by examiner

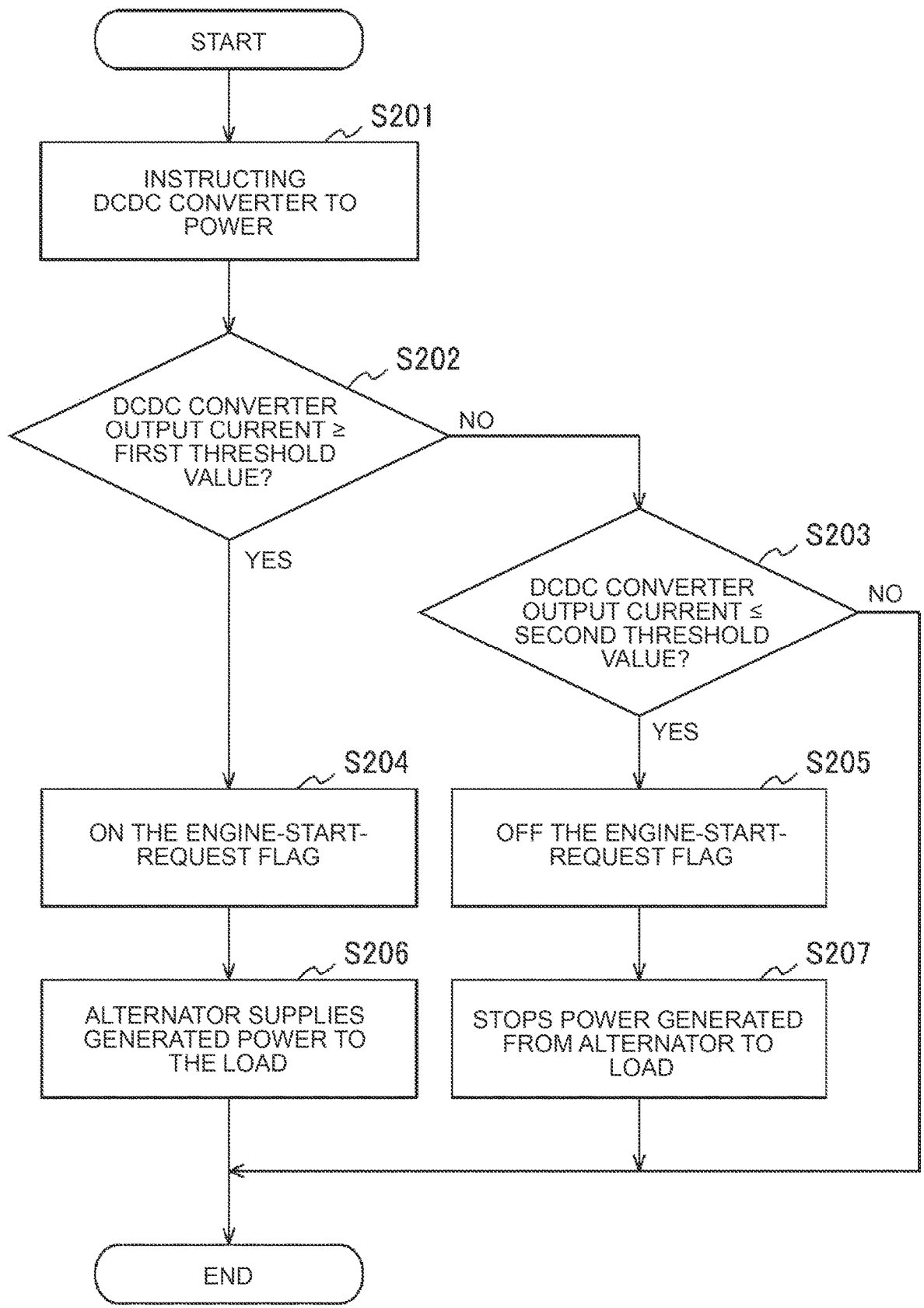

POWER CONTROL DEVICE

CROSS-REFERENCE TO RELATED APPLICATION

This application claims priority to Japanese Patent Application No. 2022-200217 filed on Dec. 15, 2022, incorporated herein by reference in its entirety.

BACKGROUND

1. Technical Field

The present disclosure relates to a power control device that controls output electric power of a power supply system.

2. Description of Related Art

Japanese Unexamined Patent Application Publication No. 2020-157861 (JP 2020-157861 A) discloses a control device capable of more reliably starting an engine of a vehicle. JP 2020-157861 A describes a DCDC converter that limits an output current by lowering an output voltage when the output current becomes equal to or larger than a threshold value. Further, JP 2020-157861 A describes, when starting the engine by supplying electric power to a motor for starting the engine using the DCDC converter, a boost control that increases the threshold value than that of the normal time is performed.

SUMMARY

Normally, the DCDC converter has an upper limit value (output limit) of an allowable output current. Therefore, when the electric power outputted from the DCDC converter is less than the electric power required by a load of a supply destination, even when the threshold value is raised by performing the boost control described in JP 2020-157861 A, there is a possibility that the required electric power cannot be supplied to the load due to insufficient current from the DCDC converter.

The present disclosure has been made in view of the above issue, and an object of the present disclosure is to provide a power control device capable of supplying required electric power to a load even when a load of a supply destination requires a current exceeding an output limit of a DCDC converter.

In order to solve the above issue, an aspect of the technique of the present disclosure is a power control device configured to control a power supply system including a DCDC converter for supplying electric power of a battery to a load and an alternator connected in parallel with the DCDC converter in which generated electric power is able to be supplied to the load. The power control device includes a monitoring unit for monitoring a current outputted by the DCDC converter to the load, and a control unit for controlling an operation of the DCDC converter and an operation of the alternator. The control unit controls the alternator to generate electric power when an output current of the DCDC converter monitored by the monitoring unit is equal to or larger than a first threshold value. The control unit controls the alternator not to generate electric power when an output current of the DCDC converter monitored by the monitoring unit is equal to or smaller than a second threshold value that is smaller than the first threshold value.

According to the power control device of the present disclosure, when the load of the supply destination requires a current exceeding the output limit of the DCDC converter, since the DCDC converter and the alternator output electric power to the load in parallel, the required electric power can be supplied to the load.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a processing flowchart of power control executed by the power control device.

DETAILED DESCRIPTION OF EMBODIMENTS

Figure 1:
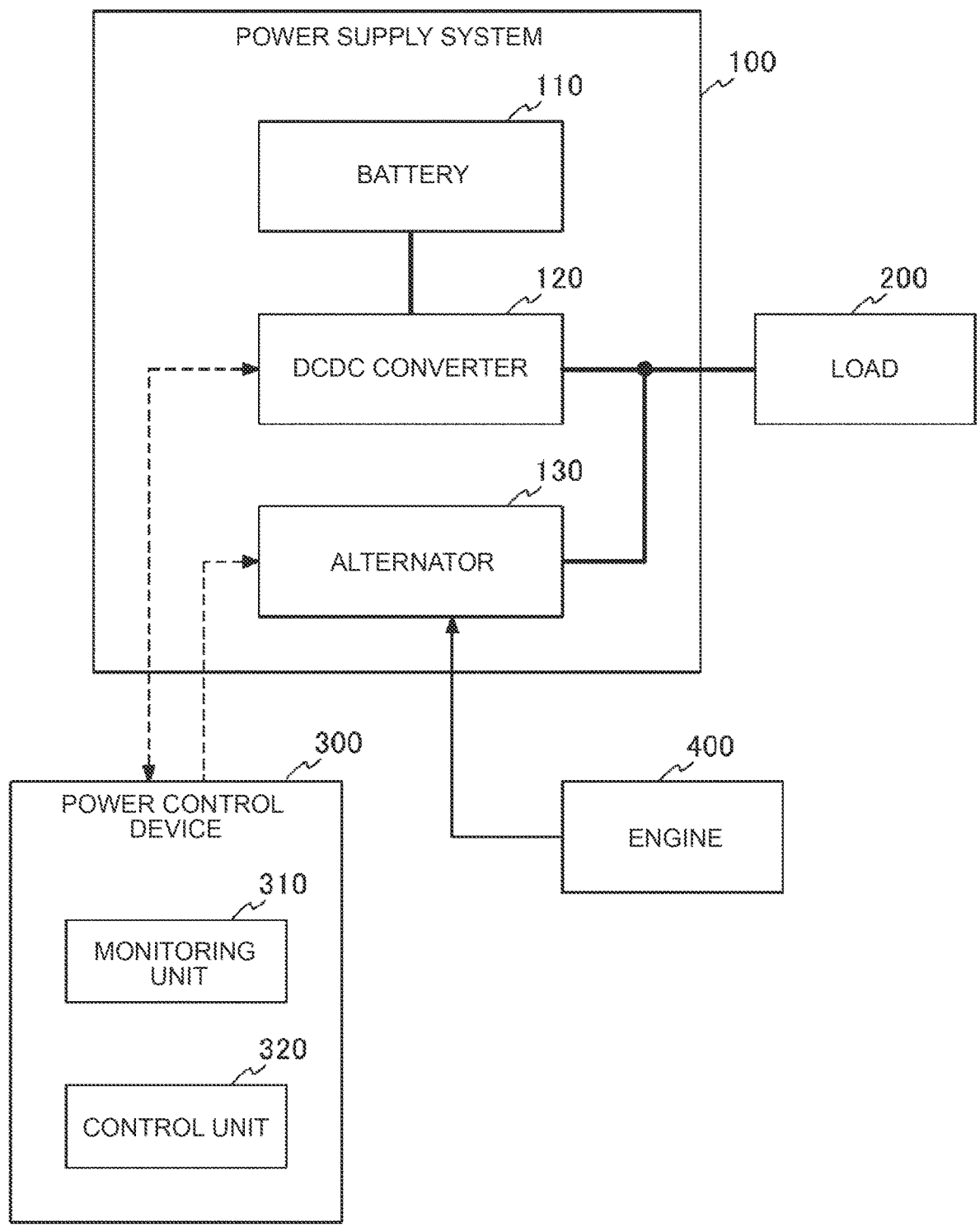
FIG. 1 is a block diagram of a power control device and a peripheral portion thereof according to an embodiment of the present disclosure.

The power control device is configured to control a power supply system including a DCDC converter that supplies power from a battery to a load and an alternator that is connected to the load in parallel with DCDC converter. The power control device provides electric power to the load in parallel from the DCDC converter and the alternator, respectively, if the DCDC converter exceeds the output limit only by supplying electric power to the load from the DCDC converter. By this control of the parallel supply, the required power can be supplied to the load. Hereinafter, an embodiment of the present disclosure will be described in detail with reference to the drawings.

EMBODIMENT

Configuration

FIG. 1 is a functional block diagram illustrating a schematic configuration of a power control device 300 and a peripheral portion thereof according to an embodiment of the present disclosure. The functional block illustrated in FIG. 1 includes a power supply system 100, a load 200, a power control device 300, and an engine 400.

The power control device 300 is mounted on vehicles such as hybrid electric vehicle (HEV) and plug-in hybrid electric vehicle (PHEV) using the engine 400 as an internal combustion engine as a power source, for example.

The power supply system 100 is a configuration for supplying power to the load 200. The power supply system 100 includes a battery 110, a DCDC converter 120, and an alternator 130.

The battery 110 is a secondary battery configured to be chargeable and dischargeable, such as a lithium-ion battery or a nickel-metal hydride battery. The battery 110 may output the stored power to DCDC converter 120. Examples of the battery 110 include a driving battery used for traveling of a vehicle.

DCDC converter 120 is a voltage converter that is provided by connecting the battery 110 and the load 200, converts the power of the battery 110 into the power of a voltage suitable for the load 200, and outputs the power to the load 200. DCDC converter 120 is connected to the power control device 300 by a signal line (a dotted line in FIG. 1), and the operation thereof is controlled by an instruction from the power control device 300 in response to a request from the load 200 or the like. As DCDC converter 120, a step-down type DCDC converter that lowers the voltage of the battery 110 and outputs the voltage to the load 200 can be exemplified.

The alternator 130 is a generator capable of generating electricity in response to driving of the engine 400. The alternator 130 is connected in parallel with the DCDC converter 120 so that the generated electric power of the alternator 130 and the electric power of the DCDC converter 120 can be outputted to the load 200. The power control device 300 controls whether or not the alternator 130 can output the generated power.

The power control device 300 is configured to control power from DCDC converter 120 and/or the alternator 130 to the load 200. The power control device 300 includes a monitoring unit 310 and a control unit 320.

The monitoring unit 310 monitors a current outputted from DCDC converter 120 to the load 200 for supplying electric power. The output current of DCDC converter 120 can be obtained by using a current sensor (not shown) or the like provided in the power supply system 100 or the like.

The control unit 320 controls operations of DCDC converter 120 and the alternator 130. More specifically, the control unit 320 instructs DCDC converter 120 to provide power from the battery 110 to the load 200 in response to a power requirement of the load 200 or the like. Further, the control unit 320 controls the operation (power generation status) of the alternator 130 based on the output current of DCDC converter 120 monitored by the monitoring unit 310. Control regarding the operation of the alternator 130 will be described later.

A part or all of the power control device 300 described above may be constituted by an electronic control unit (HV_ECU, EFI_ECU, etc.) typically including a processor such as a microcomputer, a memory, an input/output interface, and the like. The electronic control unit can realize some or all of the functions performed by the monitoring unit 310 and the control unit 320 by the processor reading and executing a program stored in the memory.

The load 200 is an electronic device, equipment, or the like that consumes electric power mounted on the vehicle. The load 200 are configured to operate with the power of the battery 110 supplied via DCDC converter 120 and/or the power generated by the alternator 130. The load 200 may be operated by electric power of another battery (e.g., an auxiliary battery, not shown).

Control

Next, with further reference to FIG. 2, control performed by the power control device 300 according to the present embodiment will be described. FIG. 2 is a flowchart illustrating a processing procedure of power control executed by the control unit 320 of the power control device 300. The power control illustrated in FIG. 2 is started, for example, when a supply of power is requested (or power consumption occurs) by the load 200.

S201

The control unit 320 instructs DCDC converter 120 to provide power to the load 200. The supplied power is controlled by a voltage instruction value determined in accordance with a request of the load 200, a physical quantity (voltage, current) of another battery (not shown) connected to the load 200, and the like. When the control unit 320 instructs DCDC converter 120 to provide power, the process proceeds to S202.

S202

The control unit 320 acquires the output current of DCDC converter 120 monitored by the monitoring unit 310, and determines whether or not the output current of DCDC converter 120 is equal to or larger than the first threshold value. This determination is made to see if the output current of DCDC converter 120 has not exceeded its output limits. Therefore, the first threshold value can be set to any value lower than the upper limit value based on the upper limit value of the current that is allowed to be outputted to DCDC converter 120.

When the control unit 320 determines that the output current of DCDC converter 120 is equal to or larger than the first threshold value (S202. Yes), the process proceeds to S204. On the other hand, when the control unit 320 determines that the output current of DCDC converter 120 is less than the first threshold value (S202, No), the process proceeds to S203.

S203

The control unit 320 acquires the output current of DCDC converter 120 monitored by the monitoring unit 310, and determines whether or not the output current of DCDC converter 120 is equal to or less than the second threshold value. This determination is made in order to avoid the effect of the control caused by the instantaneous change of the output current of DCDC converter 120 that is determined to be equal to or greater than the first threshold value in the above-described S202 to less than the first threshold value. That is, this determination is performed in order to provide hysteresis so that transitions between the first state and the second state by S205 by S204, which will be described later, are not performed frequently. Therefore, the second threshold value can be set to any value smaller than the first threshold value that does not frequently switch between the first state and the second state in a short period of time even if the output current of DCDC converter 120 slightly fluctuates.

When the control unit 320 determines that the output current of DCDC converter 120 is equal to or less than the second threshold value (S203, Yes), the process proceeds to S205. On the other hand, when the control unit 320 determines that the output current of DCDC converter 120 exceeds the second threshold value (S203, No), the present power control is ended.

S204

The control unit 320 sets a flag for requesting the start of the engine 400 to ON. According to ON setting of this flag, the control of a predetermined electronic control unit starts the engine 400 (if it is already in operation, its operation is continued). When the control unit 320 sets the engine-start-request flag to ON, the process proceeds to S206.

S205

The control unit 320 sets a flag for requesting the start of the engine 400 to OFF. According to OFF setting of this flag, the running engine 400 is stopped by the control of the predetermined electronic control unit (if it is already stopped, the operation is continued). When the control unit 320 sets the engine-start-request flag to OFF, the process proceeds to S207.

S206

The control unit 320 supplies the electric power generated by the alternator 130 in accordance with the operation of the engine 400 to the load 200 from the alternator 130. This allows power to be supplied in parallel from DCDC converter 120 and the alternator 130 to the load 200, respectively. When the control unit 320 supplies the generated electric power of the alternator 130 to the load 200, this electric power control ends.

S207

The control unit 320 stops the power generation of the alternator 130 in accordance with the stop of the engine 400, and stops the power supply from the alternator 130 to the load 200. This returns to the initial condition in which power is supplied from only DCDC converter 120 to the load 200. When the power supply from the alternator 130 to the load 200 is stopped by the control unit 320, this power control is ended.

Operations and Effects

As described above, according to the power control device 300 of the embodiment of the present disclosure, in the power supply system 100 including DCDC converter 120 that supplies the power of the battery 110 to the load 200 and the alternator 130 that is connected in parallel with DCDC converter 120 so that the generated power can be supplied to the load 200, when the output current of DCDC converter 120 that supplies the power of the battery 110 to the load 200 is equal to or larger than the first threshold value, the engine 400 is started to generate the alternator 130, and when the output current of DCDC converter 120 is equal to or smaller than the second threshold value, the alternator 130 is not generated.

By this control, when the load 200, which is a power supply destination, needs a current exceeding the output limit of DCDC converter 120, DCDC converter 120 and the alternator 130 output power to the load 200 in parallel, and thus the required power can be supplied to the load 200.

Although an embodiment of the present disclosure has been described above, the present disclosure can be regarded as a method executed by a power control device including not only a power control device but also a processor, a memory, and the like, a program for executing the method, a computer-readable non-transitory storage medium storing a program, a vehicle equipped with a power control device, and the like.

The power control device of the present disclosure can be used in vehicles equipped with a power supply system including a DCDC converter and an alternator.

What is claimed is:
1. A vehicle comprising:
    an engine;
    an electronic device as a load:
    a power supply system including
        a battery,
        a step-down DCDC converter configured to supply electric power of the battery to the electronic device, and
        an alternator configured to generate electric power in response to driving of the engine, wherein the alternator is connected in parallel with the step-down DCDC converter; and
    a processor configured to
        monitor a value of an output current outputted from the step-down DCDC converter to the electronic device
        start the engine to cause the alternator to generate the electric power when the monitored value of the output current is equal to or larger than a first threshold value, and
        stop the alternator from generating the electric power when the monitored value of the output current is equal to or smaller than a second threshold value that is smaller than the first threshold value.
2. The vehicle according to claim 1, wherein the first threshold value is set based on an output current limit value of the step-down DCDC converter.
3. The vehicle according to claim 1, wherein the processor is further configured to
    receive a power supply request from the electronic device to be supplied with power, and
    instruct the step-down DCDC converter to supply power to the electronic device in response to receiving the power supply request.

\* \* \* \* \*